United States Patent [19]

Luetzelschwab

[11] Patent Number: 4,965,298

[45] Date of Patent: Oct. 23, 1990

[54] PREPARATION AND COOLING OF AQUEOUS POLYMER SOLUTION

[75] Inventor: Wayne E. Luetzelschwab, Littleton, Colo.

[73] Assignee: Marathon Oil Company, Findlay, Ohio

[21] Appl. No.: 232,726

[22] Filed: Aug. 16, 1988

[51] Int. Cl.$^5$ .............................................. C08F 6/06
[52] U.S. Cl. ....................... 523/306; 524/804; 524/827; 525/329.4; 528/503; 165/109.1
[58] Field of Search ............... 523/306, 315; 528/503, 528/502; 525/329.4; 366/336; 165/109.1; 524/827, 804

[56] References Cited

U.S. PATENT DOCUMENTS

| | | | |
|---|---|---|---|
| 978,443 | 12/1910 | Fleming | 568/619 |
| 2,904,409 | 9/1959 | Bolstad | 23/285 |
| 2,910,350 | 10/1959 | Jean | 23/289 |
| 2,963,470 | 12/1960 | Lanning | 260/88.2 |
| 3,035,040 | 5/1962 | Findlay | 260/94.9 |
| 3,172,737 | 3/1965 | Whittington | 23/285 |
| 3,424,733 | 1/1969 | Pollock | 260/85.3 |
| 3,425,993 | 2/1969 | Perry | 260/75 |
| 3,458,467 | 7/1969 | Herrle et al. | 260/29.6 |
| 3,474,081 | 10/1969 | Bosworth | 260/89.5 |
| 3,630,688 | 12/1971 | Takiguchi et al. | 23/285 |
| 4,008,048 | 2/1977 | Hellemans et al. | 23/260 |
| 4,110,521 | 8/1978 | Barnett et al. | 526/64 |
| 4,143,702 | 3/1979 | Barr, Jr. | 165/1 |
| 4,177,240 | 12/1979 | Bianco | 422/155 |
| 4,209,599 | 6/1980 | Brady et al. | 526/65 X |
| 4,229,416 | 10/1980 | Donaldson et al. | 422/134 |
| 4,508,858 | 4/1985 | Luetzelschwab | 523/313 |
| 4,559,202 | 12/1985 | Luetzelschwab | 422/134 |
| 4,667,730 | 5/1987 | Zemp | 165/14 |

Primary Examiner—Joseph L. Schofer
Assistant Examiner—F. M. Teskin
Attorney, Agent, or Firm—Jack L. Hummel; Jack E. Ebel

[57] ABSTRACT

A process for preparing aqueous polymer solutions wherein a section of a fluid conduit through which a stream of liquid polymer product flows contains spaced static mixers. Heated water from a heat exchanger surrounding the section of conduit containing the mixers is introduced to a reactor to function as reaction water. The static mixers are spaced apart enough to enable the heat exchanger to sufficiently cool the liquid polymer product. The mixers function to mix other liquid agents with the liquid polymer product and to mix together warmer and cooler quantities of liquids encountered in the conduit.

8 Claims, 1 Drawing Sheet

PREPARATION AND COOLING OF AQUEOUS POLYMER SOLUTION

FIELD OF THE INVENTION

This invention relates to the preparation of aqueous polymer solutions. More particularly, it relates to improvements in the preparation of aqueous polymer solutions which make it possible to utilize high-temperature polymers.

BACKGROUND OF THE INVENTION

In U.S. Pat. Nos. 4,508,858 and 4,559,202 a method and apparatus are disclosed for continuously preparing aqueous polymer solutions such as partially hydrolyzed polyacrylamides. The apparatus includes a reactant-receiving vessel in which polymerization is initiated, a reactor in which polymerization is completed and a post-polymerization reactor or hydrolyzer in which polymer from the reactor is converted to the desired form. The initial reaction temperature is stated to be in the range of about 100° F. to 110° F. When polymerization has reached completion the polymer solution is withdrawn from the reactor and directed through a static mixer where it is mixed under continuous flow conditions with hydrolyzing agents, after which the mixture continues to the hydrolyzer. Although the patents are silent on the final polymerization temperatures, a final polymer temperature in the order of 135° F. could be expected when the initial temperature is 105° F.

It is now possible to carry out polymerization at higher temperatures than those disclosed in the U.S. Patents referred to above. This increases the polymer throughput, thus reducing plant costs. For example, initial and final temperatures of about 140° F. and 190° F., respectively, have been employed. While such temperatures permit the benefits mentioned, they also make the polymer susceptible to degradation in the context of a residence time of more than one or two days. Significant degradation can be avoided by operating with short residence times, but this would restrict operational flexibility and fail to make use of the desired storage capacity of the hydrolyzer.

It would be economically beneficial to be able to operate at the higher polymerization temperatures which have now become possible without, however, having to compensate by employing significantly shorter periods of residency in order to avoid degradation due to the high temperatures.

SUMMARY OF THE INVENTION

In accordance with the invention, heat transfer means are provided in conjunction with static mixing means in the conduit through which the liquid polymer flows after leaving the reactor. This arrangement provides several important functions. The heat exchanger cools the polymer solution to lower its temperature to a point which avoids the risk of polymer degradation, and the mixer not only is able to mix additives introduced into the conduit but also acts to mix the cooler portions of the polymer with the warmer portions of the polymer to provide a mixture of generally uniform temperature. In addition, the heated water from the heat exchanger can be introduced into the reactor as reaction water, thereby recovering valuable heat.

Preferably, in carrying out the invention, conventional static mixers are spaced apart in the conduit, and a jacket through which cooling water flows is provided on the conduit along the section of the conduit in which the static mixers are in place. The length of the jacket and the mixing section may vary, but should be long enough to allow the temperature of the polymer solution to be lowered to the desired temperature. When used in conjunction with a process incorporating a hydrolysis step, the cooled solution would then be introduced into the hydrolyzer.

Other features and aspects of the invention, as well as other benefits thereof, will readily be ascertained from the more detailed description of the invention which follows.

DESCRIPTION OF THE PREFERRED EMBODIMENT

Figure 1:
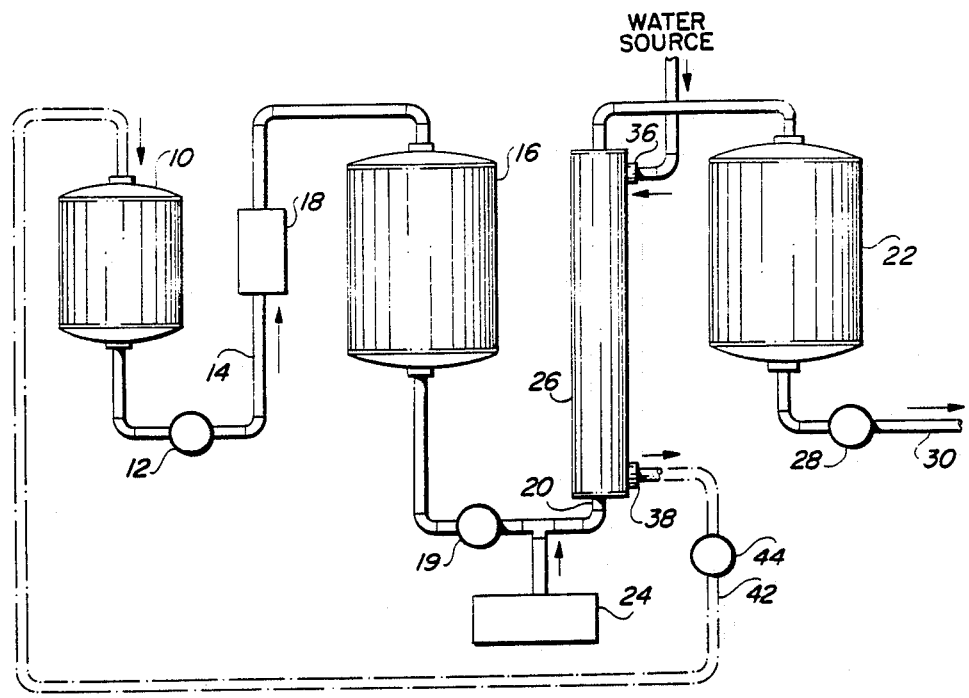
FIG. 1 is a diagrammatic view of the elements in a typical polymerization process incorporating the present invention.

One arrangement of elements for carrying out the invention in connection with a process for preparing an aqueous polymer solution is shown in FIG. 1 to include a vessel 10 into which monomer, water and initiators are fed. A pump 12 transfers the reaction mixture from the vessel 10 through the conduit 14 to the reactor 16. A heat exchanger 18 of conventional type is located in the conduit between the pump 12 and the reactor 16. When polymerization has reached completion, the polymer solution is withdrawn from the reactor 16 and is pumped by pump 19 through conduit 20 into the hydrolyzer 22. One or more hydrolyzing agents are introduced from a source 24 into the conduit 20 in order to be mixed with the polymer solution prior to reaching the hydrolyzer 22. For this purpose, and for the reasons explained more fully hereinafter, a combination mixing and cooling section 26 is provided downstream from the point of introduction of the hydrolyzing agents. When the hydrolysis reaction has gone to completion the partially hydrolyzed polymer solution is withdrawn from the hydrolyzer 22 by the pump 28 which moves the solution through conduit 30 for further treatment or use.

For a more detailed explanation of the basic polymerization process, the details of which do not form a part of the present invention, attention is directed to the previously mentioned U.S. Pat. Nos. 4,508,858 and 4,559,202.

Figure 2:
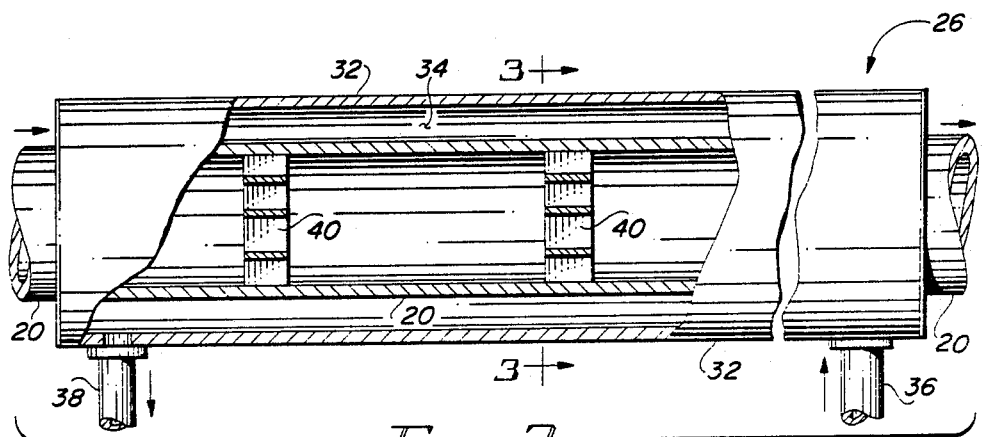
FIG. 2 is an enlarged partial view, portions of which are shown in longitudinal cross-section, of the section of conduit containing the static mixers and the heat exchanger.
Figure 3:
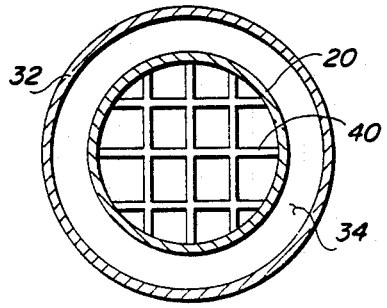
FIG. 3 is a transverse cross-sectional view taken on line 3—3 of FIG. 2.

Referring to FIGS. 2 and 3, it can be seen that the heat exchanger 26 comprises a cylindrical jacket 32, the ends of which are closed, surrounding the conduit 20 so as to provide an annulus 34 between the jacket and the conduit. An inlet 36 communicates with the annulus at the downstream end of the jacket and an outlet 38 communicates with the annulus at the upstream end of the jacket. Static mixers 40 are located in the conduit 20 at spaced locations along the section of the conduit covered by the jacket 32. Although not shown, it may be desirable to modify the heat exchanger by providing a spiral in the annulus in order to force the cooling liquid to flow along a path of smaller transverse crosssectional area, thereby increasing its velocity. This is helpful in situations where the rate of flow of the cooling liquid is low, such as when heating reaction water in a single pass.

In operation, cooling water is introduced by a pump, not shown, into the annulus 34 through the inlet 36 and is caused to flow toward the upstream end of the annulus, where it exits the jacket through the outlet 38. Assuming the cooling water to be 80° F. when it enters the jacket, it will lower the temperature of the conduit wall so that the polymer solution near the conduit wall will be cooled. Since the temperature of the polymer solution may be as high as about 190° F. as it enters the heat exchanger, the temperature of the polymer solution adjacent the conduit wall will be lowered a considerable amount.

Normally, such a cooling process would be limited to the cooling brought about by conduction alone, which is too slow to bring about the desired levels of temperature reduction. The polymer at the heat exchange surface would soon cool and approach the temperature of the cooling water, resulting in a low temperature differential between that portion of the polymer and the cooling water without, however, causing sufficient reduction in the average polymer temperature. By mixing the polymer through the use of spaced static mixers, the hotter polymer from the center of the polymer flow is continually brought into contact with the heat exchange surface, thus maintaining a relatively high differential temperature between the polymer and the cooling liquid and rapidly cooling the entire quantity of polymer flowing through the pipe. For example, a mixing and cooling section of about 30 feet in length, using a conduit having an inner diameter of 4 inches, a jacket having an inner diameter of 5 inches and cooling water having an initial temperature of 80° F., can be expected to lower the temperature of the polymer solution from about 190° F. to about 135° F.

The mixer may be comprised of any type of conventional static mixer elements capable of mixing and blending streams of different liquids in an acceptable efficient manner. For example, Koch SMX static mixer elements, which may also be known as Sulzer SMX static mixer elements, have been found to perform adequately. In a conventional static mixer, the mixer elements would be quite closely spaced to provide an overall compact mixing unit. In accordance with the invention, however, sufficient mixing must be provided over substantially the entire length of the heat exchanger in order to blend the hotter and cooler portions of the polymer together as well as to mix the polymer with any agents introduced into the conduit upstream from the mixer. It has been found that these functions can be provided over a relatively long section of conduit through the use of mixer elements which are spaced substantially farther apart than in conventional static mixers so as to periodically redistribute flow throughout the heat exchanger. For example, for a 30- foot heat exchanger, 10 to 12 mixer elements generally uniformly spaced apart would be sufficient to carry out such a redistribution of flow. In general, the mixer elements are spaced apart a distance which varies according to the diameter of the pipe or conduit. Thus the spacing may vary widely, such as a distance in the broad range of 1 to 30 pipe diameters. In many practical applications, however, a spacing in the range of 4 to 20 pipe diameters would be anticipated.

Referring back to the example of polymer entering the heat exchanger section of the conduit at a temperature in the order of 190° F., when such a polymer is subjected to the mixing action of spaced static mixers and to the cooling effect of a 30-foot heat exchanger containing cooling water at an initial temperature of 80° F., the polymer can be expected to be cooled to about 135° F. upon leaving the heat exchanger section. The cooling water in such a case would take on additional heat to raise its temperature to about 130° F. upon exiting the heat exchanger. As shown in FIG. 1, such heated water is conveyed through conduit 42 by pump 44 and is introduced into the vessel 10 as reaction water. Since the reaction water is now about 50° F. warmer than ambient water would be, a significant amount of energy is saved.

It will be understood that although the invention has been described in connection with a polymer preparation process which includes a hydrolyzer, and in connection with the re-use of the cooling water as reaction water in the process, the combination mixer and cooling section of the present invention may be independently used in processes which do not require a hydrolyzer. In such cases the mixer and cooler will be of separate utility to uniformly cool liquid polymeric material whether or not the mixer is used to mix other liquids with the polymer.

It should now be clear that the present invention provides a simple but highly efficient means of cooling high temperature polymers so that they can be utilized without danger of degradation. It should further be understood that the invention is not necessarily limited to all the specific details described in connection with the preferred embodiment but that changes which do not affect the overall basic function and concept of the invention may be made by those skilled in the art without departing from the spirit and scope of the invention, as defined in the appended claims.

What is claimed is:

1. In a process for the preparation of an aqueous polymer solution utilizing a vessel into which monomer, water, and initiator are fed to form a reaction mixture which is transferred to a reactor to form the aqueous polymer solution, the improvement comprising the steps of:

providing static mixer means in a fluid conduit through which said aqueous polymer solution is flowing;

providing heat transfer means contiguous to the fluid conduit to remove heat from the aqueous polymer solution flowing through the static mixer means, the heat transfer means utilizing cooling water to effect the heat transfer; and introducing heated water from the heat transfer means into the vessel to function as reaction water in the process.

2. A process according to claim 1, wherein the static mixer means comprises a series of spaced static mixers in the fluid conduit, and the heat transfer means comprises a jacket around the fluid conduit through which cooling water flows.

3. A process according to claim 2, wherein the static mixers are spaced apart a distance in the range of 1 to 30 diameters.

4. A process according to claim 2, including the step of introducing a second liquid into the fluid conduit upstream from the static mixers, the static mixers functioning to mix the second liquid with the aqueous polymer solution and to mix cooler quantities of the aqueous polymer solution with warmer quantities of solution.

5. A process according to claim 4, including the step of introducing the mixed and cooled aqueous polymer solution into a hydrolyzer.

6. A process according to claim 5, wherein the aqueous polymer solution being prepared is partially hydrolyzed polyacrylamide.

7. A method of cooling aqueous polymer solution flowing through a conduit connecting a reactor with a hydrolyzer, comprising the steps of:

cooling the conduit along a relatively long length thereof to cool the aqueous polymer solution in the vicinity of the conduit wall substantially more than the aqueous polymer solution near the center of the conduit;

mixing the aqueous polymer solution from the vicinity of the conduit wall with the aqueous polymer solution near the center of the conduit at spaced intervals along the length of conduit being cooled;

whereby the aqueous polymer solution is repeatedly mixed to produce a generally uniformly mixed aqueous polymer solution of generally uniform temperature and introducing said generally uniformly mixed aqueous polymer solution to said hydrolyzer.

8. A method of cooling aqueous polymer solution according to claim 7, wherein the conduit is cooled by the steps of:

providing a jacket around a relatively long section of the conduit, the jacket being spaced from the conduit to provide an annulus therebetween; and introducing cooling liquid into the annulus at one end of the jacket and removing the liquid from the other end;

the aqueous polymer solution being mixed by providing spaced static mixers along the section of conduit being cooled.

* * * * *